United States Patent Office 3,801,549
Patented Apr. 2, 1974

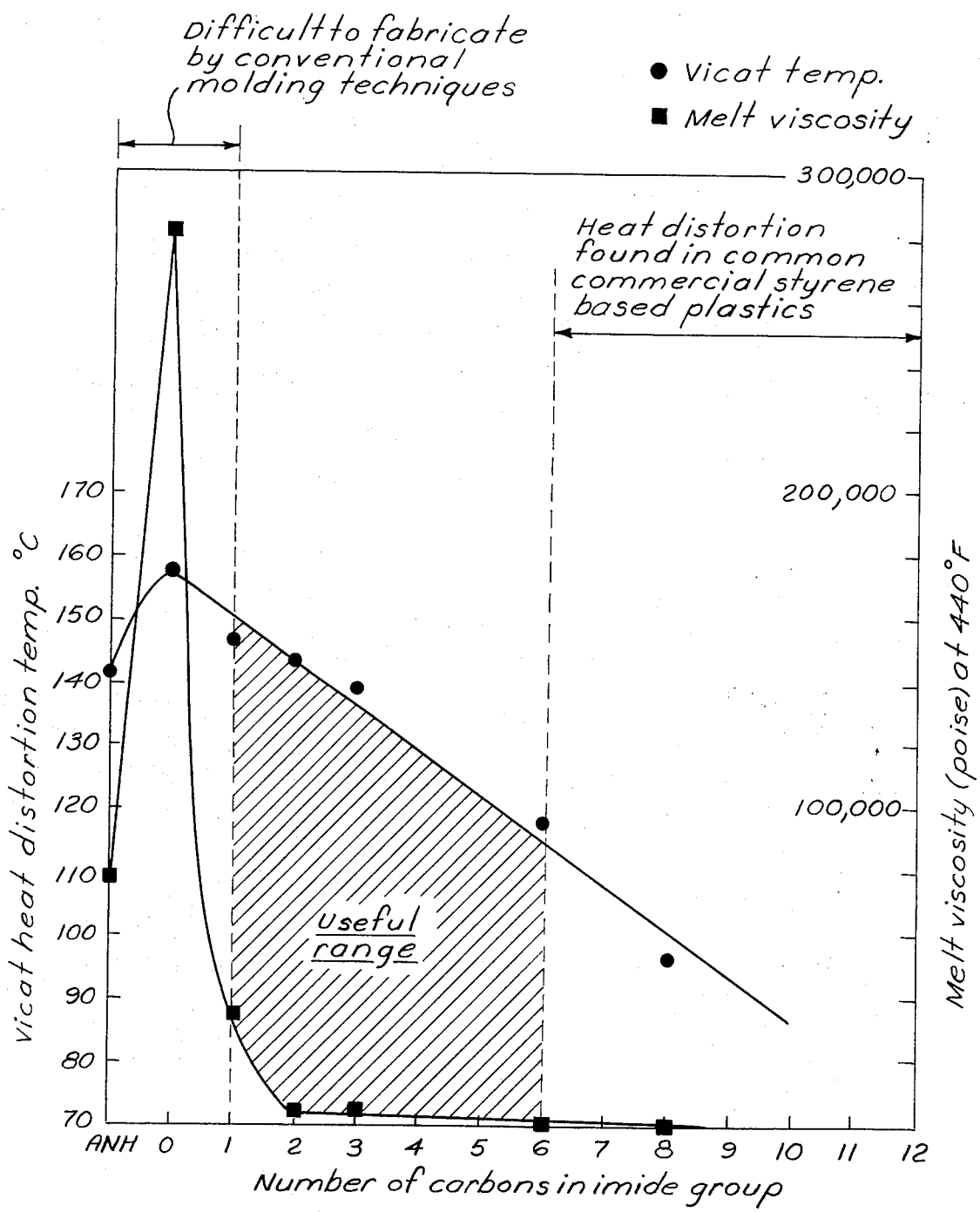

3,801,549
LOW MELT VISCOSITY MOLDING PROCESS FOR HIGH HEAT DISTORTION INTERPOLYMERS
Eugene R. Moore and Linton E. Smith III, Midland, and Dale M. Pickelman, Auburn, Mich., assignors to The Dow Chemical Company, Midland, Mich.
Continuation-in-part of application Ser. No. 836,981, June 26, 1969. This application Oct. 17, 1972, Ser. No. 298,418
Int. Cl. C08f 19/02, 27/08, 47/00
U.S. Cl. 260—78 UA                                          10 Claims

ABSTRACT OF THE DISCLOSURE

The improvement of this invention is a result of modifying the flow behavior of alkenyl aromatic thermoplastic interpolymers to provide both high heat distortion and low melt viscosity. The modification is the result of introducing into the interpolymer about 5 to 50 mole percent of N-alkyl dicarboxylic imide groups where the alkyl group contains from 1 to 6 carbon atoms.

CROSS REFERENCES

This application is a continuation-in-part of copending application, Ser. No. 836,981 filed on June 26, 1969, now abandoned.

BACKGROUND OF THE INVENTION

This invention relates to an improved molding process employing polystyrene based molding resins which have high heat distortions and low melt viscosities. Polystyrene itself is a readily molded thermoplastic polymer, however it has relatively low heat distortion characteristics. To compensate for the latter, attempts have been made to improve the heat distortion properties by copolymerizing styrene with various other monomers such as acrylonitrile, maleic anhydride and the like. Unfortunately, the melt viscosity of such copolymers increases correspondingly as the heat distortion temperature is raised which makes the polymers more difficult to mold. The thermoplastic interpolymers of this invention overcome this problem.

SUMMARY OF THE INVENTION

Accordingly, processes for preparing shaped articles from alkenyl aromatic thermoplastic interpolymers by the steps of providing a heat plastified mass of the thermoplastic, shaping same into an article and cooling below the plastifying temperature, are improved in this invention by modifying the interpolymer to provide both high heat distortion and low melt viscosity.

The modification is a result of introducing N-alkyl imide groups into the interpolymer such that the interpolymer contains in polymerized form at least about 50 mole percent of an alkenyl aromatic monomer such as styrene, from 0 to about 25 mole percent of an unsaturated dicarboxylic acid anhydride such as maleic anhydride, a N-alkyl half amide derived from said acid anhydride wherein said alkyl group contains from 1 to 6 carbon atoms or mixtures thereof, and from about 5 to 50 mole percent of an unsaturated N-alkyl dicarboxylic acid imide wherein said alkyl group contains from 1 to 6 carbon atoms.

DRAWINGS

The graph shows a plot of melt viscosity and heat distortion of an interpolymer according to this invention against the number of carbons in the imide group. For comparison purposes, data are shown for the unsubstituted imide (0) and for the anhydride (anh.) form of the interpolymer. The graph is a plot of data from Example 1 herein.

DESCRIPTION OF THE INVENTION

Many applications for plastic materials require high heat distortion properties. Unfortunately, attempts to provide high heat distortion usually result in an increase in melt viscosity, e.g. modification of polystyrene to a copolymer of maleic anhydride and styrene. Melt viscosity may be lowered by decreasing the molecular weight or by increasing the temperature. However, decreasing the molecular weight has a detrimental effect on the physical properties and increasing the temperature above certain levels results in polymer degradation and losses in physical properties. Higher molding temperatures also result in an increase in the molding cycle.

The higher the temperature of the melted polymer the more the polymer must be cooled to solidify the shaped or molded part. As part size increases this becomes a more important factor because the cooling cycle becomes a limiting factor and may even become an overwhelming bottleneck. Thus low polymer melt viscosity is highly desirable since it allows for molding at lower temperatures with shorter cycle times.

The modification of flow properties of the interpolymer herein is best illustrated by reference to the drawing where a plot of melt viscosity and heat distortion against the number of carbons in the imide group is shown, based on data from Example 1. The shaded area indicates the most useful range for molding. It can be seen that an unsubstituted imide (0 on the graph) has a very high melt viscosity compared to the N-alkyl imides and the area to the left of the N-methyl imides (1 on the graph) represents interpolymer compositions which are more difficult to fabricate by conventional molding techniques. The area to the right of N-hexyl imides (6 on the graph) represents interpolymer compositions with heat distortions obtainable from other styrene based thermoplastics. It is important to note the high heat distortions throughout the useful range and the low melt viscosities in the same range. This combination of properties is very desirable and has been unexpectedly found in the interpolymers of this invention. The introduction of the N-alkyl imide groups results in a significant decrease in melt viscosity but with retention of heat distortion.

Accordingly, this invention is directed to an improved molding process which utilizes said N-alkyl imide interpolymers and which derives many useful benefits and advantages because of the low melt viscosity of the interpolymers, yet at the same time articles with high heat distortion may be readily molded.

The moldable interpolymers may be prepared in several ways. A mixture of monomers within the defined proportions may be interpolymerized by known free radical initiated processes. Such techniques and methods are well known to the art. Alternately the interpolymers may be prepared by chemical modification of an anhydride containing polymer in which an alkyl primary amine is reacted with the anhydride group of said polymer.

The ultimate interpolymer consists in polymerized form of at least about 50 mole percent of an alkenyl aromatic monomer which, among others, includes styrene, α-methyl styrene, vinyl toluene, vinyl naphthalene, t-butyl styrene and other alkyl substituted monomers p-chlorostyrene as well as other like halogenated monomers, mixtures of same and the like.

From 0 to about 25 mole percent of the interpolymer consists of an ethylenically unsaturated dicarboxylic acid anhydride such as maleic anhydride, halogen or lower alkyl substituted maleic anhydrides, itaconic anhydride, citraconic anhydride and the like. Said anhydride may be partially or completely replaced by a N-alkyl half amide derived from said anhydride such as the N-ethyl half amide of maleic acid. The alkyl group contains from 1 to 6 carbon atoms and includes methyl, ethyl, butyl, hexyl, etc. as well as cycloalkyl groups such as cyclohexyl and the like.

The remainder of the interpolymer, from about 5 to 50 mole percent, consists of an N-alkyl imide of an unsaturated dicarboxylic acid wherein the alkyl group is as previously defined. Typical monomers include N-ethyl maleimide, N-cyclohexyl maleimide and other N-alkyl imides of dicarboxylic acids derived from said anhydrides. Mixtures of said imide monomers are contemplated.

In addition to direct polymerization of the particular monomers, a convenient method for preparation of the interpolymers of this invention is to first prepare a copolymer of the alkenyl aromatic monomer and the anhydride monomer such as a copolymer of styrene and maleic anhydride and then to react an alkyl primary amine with the anhydride functionality of said copolymer. The reaction with the anhydride portion of the copolymer may be shown as follows:

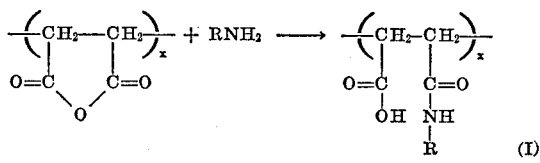

(I)

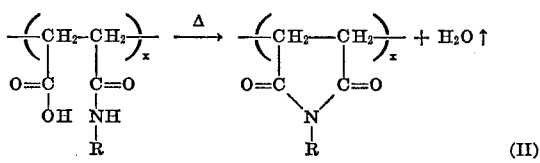

(II)

It is apparent that if a molar ratio of amine/anhydride of less than 1/1 is used the interpolymer will contain unreacted anhydride groups. Further if the product of reaction (I) is not heated long enough only a portion of the half amide groups will be converted to the imide. In either case there is no loss in the benefits of this invention provided that at least 5 mole percent of the final interpolymer consists of said imide group.

In the formulas above only the reactive anhydride portion of the copolymer was shown and $x$ is merely a number greater than 1. The R group corresponds to the previously defined alkyl group.

The amine reactant can be conveniently combined with an anhydride copolymer stream as it is withdrawn from the polymerization reactor and after allowing sufficient time for at least the first reaction (I) above to take place the copolymer stream can then be devolatilized to remove unreacted monomers, amine, solvents, etc. Since both the polymerization and the devolatilization usually takes place at an elevated temperature sufficient heat is available to cause both reaction (I) and (II) to take place readily. If not, additional heat can be easily applied. Generally, a temperature of about 50° C. up to about 250° C. is preferred. At lower temperatures the rate of reaction is slow and at higher temperatures the possibility of polymer degradation exists. Other methods than the specific process described above may be used and would be apparent to the skilled worker. The invention is not limited to any particular method of preparing the interpolymers.

It should be understood that the advantages of this invention may also be obtained by blending a polymer containing the alkyl imide groups with an unreacted anhydride polymer provided that the resultant blend contains at least 5 mole percent of said N-alkyl imide monomer component.

The copolymerization of styrene and maleic anhydride and like monomers in both equal and non-equimolar proportions is so well known that no details of such preparations are considered necessary herein. See U.S. Pat. 3,336,267 for example.

The following non-limiting examplesw ill further illustrate the invention and all parts and percentages are by weight unless otherwise specified.

EXAMPLE 1

Interpolymers useful in this invention were prepared by reacting various primary amines with a styrene maleic anhydride, 79.4/21.6, 7.82 cps. (10 wt. percent solution in methyl ethyl ketone at 25° C.) copolymer. The reaction with ethyl and propyl amine was obtained by adding the cold liquid amine to the SMA copolymer in a polyethylene bottle (one mole of amine/mole of anhydride). After reaction the aminated copolymer was converted to the imide by melting and milling it on a two-roll rubber mill for one-half hour at about 170° C. The product was further devolatilized by heating at 213° C. for 4 hours under a vacuum of 5 mm. Hg. Higher molecular weight amines were reacted by dissolving the SMA copolymer in methyl ethyl ketone (33% solids) with a Waring Blendor and slowly adding the amine to the SMA solution. The aminated resin was air dried for one week and then converted to the imide as above. The results are shown in Table I.

For comparison purposes data are shown in Table I for the base styrene-maleic anhydride copolymer (i.e. the non-aminated polymer) and for a polymer reacted with ammonia to produce the maleimide functionality. The latter reaction can be obtained by combining gaseous ammonia with the solid polymer or a melt thereof and subsequently heating to obtain the imide. Lower molecular weight maleimides can be conveniently prepared by a gaseous reaction with methyl amine and the like.

A similar series of reactions was run with a SMA copolymer containing 14.7% maleic anhydride having a viscosity of 7.95 cps. The results of this run are also included in Table I.

It can be seen from Table I that the melt viscosity of the ammoniated derivative is even higher than the base polymer, and while the melt viscosity of the n-octyl amine is low the heat distortion (Vicat temperature) has decreased considerably also. The methyl amine derivative shows a substantial reduction in viscosity over the base polymer. The melt viscosity is the apparent viscosity at 440° F. and a shear stress of 700,000 dynes per sq. cm. calculated in the manner described in ASTM D–1703.

High heat distortion articles are readily molded, such as by melt extrusion, injection molding, etc. from any of the N-methyl to N-hexyl imide interpolymers described in Table I.

TABLE I

| SMA copolymer, gms. | Amine | Amine, gms. | Vicat temp., °C. | Melt viscosity at 440° F., poises | Analysis, percent O | Percent conversion to imide, based on percent O |
|---|---|---|---|---|---|---|
| (Control) | None | | 141.7 | 78,133 | 10.78 | |
| Do | Ammonia | | 157.8 | 283,884 | 9.15 | 40.3 |
| 200 [1] | Methyl | 13.7 | 146.8 | 35,131 | 7.97 | 69.9 |
| 200 [1] | Ethyl | 19.9 | 143.5 | 4,114 | 7.60 | 75.8 |
| 200 [1] | n-Propyl | 26.0 | 139 | 5,292 | 7.70 | 70.2 |
| 200 [1] | n-Hexyl | 44.6 | 117.5 | 1,249 | 7.58 | 64.9 |
| 200 [1] | n-Octyl | 56.9 | 96.5 | 518 | 6.47 | 83.7 |
| (Control) [2] | None | | 130.2 | 30,055 | | |
| Do | Ammonia | | 139 | 51,158 | 6.23 | 40.4 |
| 200 [2] | Methyl | 9.3 | 135.3 | 15,193 | 5.32 | 75.5 |
| 200 [2] | Ethyl | 13.5 | 130 | 2,648 | 5.30 | 73.4 |
| 200 [2] | n-Propyl | 17.7 | 131.5 | 5,570 | 5.66 | 57.5 |
| 200 [2] | n-Hexyl | 30.3 | 112 | 1,834 | 5.11 | 71.1 |
| 200 [2] | n-Octyl | 38.7 | 101.5 | 866 | 4.66 | 82.2 |

[1] 79.4% styrene, 21.6% maleic anhydride, 7.82 cps.
[2] 85.3% styrene, 14.7% maleic anhydride, 7.95 cps.

EXAMPLE 2

Further evaluation of various ethyl amine derivatives was made at various levels of conversion. A SMA copolymer similar to Example 1 containing about 21.6% maleic anhydride was used. A weighed amount of polymer was placed in polyethylene bottles and after pulling a vacuum and reweighing, various amounts of ethyl amine gas were added. The bottles were placed in a 75° C. oven for 5 days. All samples were either extrusion or oven devolatilized to convert to the imide.

The styrene-maleic anhydride copolymer had a melt viscosity of about 45,000 poises at 440° F. where as a N-ethyl maleimide copolymer prepared from same having only about 6% N-ethyl maleimide had a melt viscosity of about 15,000 poises or a two-third reduction in viscosity. As the N-ethyl maleimide content increases the melt viscosity decreases correspondingly.

In a related experiment blends of a styrene-maleic anhydride copolymer (91.7/18.3, 13.8 cps.) and a polymer prepared from same in which about 81% of the anhydride groups were converted to the N-ethyl maleimide were prepared. Blends prepared to contain 25, 50 and 75% respectively of the N-ethyl imide polymer were prepared and found to have melt viscosities ranging from about 36,000 poises to about 12,000 poises at 440° F. The base polymer itself had a melt viscosity of about 64,500 at 460° F. and said viscosity would be higher at 440° F.

EXAMPLE 3

A styrene-maleic anhydride copolymer containing about 47.7% maleic anhydride was reacted in solution respectively with propylamine and ethylamine. In the case of propylamine about 83.7% of the anhydride groups were converted to the N-propylimide group and the melt viscosity at 440° F. was about 3533 poises. With ethylamine the polymeric product had about 76.5% of its anhydride groups converted to N-ethylimide groups and had a melt viscosity of 4819 poises at 480° F.

The base polymer melt viscosity was difficult to measure because of the high content of maleic anhydride, but it had a viscosity of 100,458 poises at 480° F. This is significantly higher than the alkyl imide derivatives of the same polymer. The heat distortion temperatures of the propyl and ethyl imide polymers above was 121.5° C. and 155° C. respectively.

The interpolymers of this invention are useful as molding and extrusion resins especially in view of their low melt viscosities and high heat distortion. Other additives may be mixed with the resin such as pigments, lubricants, inert fillers, reinforcing materials such as glass fibers, etc. and the like.

What is claimed is:

1. In a process for preparing shaped articles from alkenyl aromatic thermoplastic interpolymers by the steps which comprise providing a heat plastified mass of said thermoplastic, shaping same into said article and cooling below the plastifying temperature, the improvement which comprises modifying said interpolymer to provide both high heat distortion and low melt viscosity, said modified interpolymer consisting in polymerized form of at least about 50 mole percent of an alkenyl aromatic monomer, about 5 to 50 mole percent of an unsaturated N-alkyl dicarboxylic acid imide where the alkyl group has from 1 to 6 carbons and from 0 to about 25 mole percent of an unsaturated dicarboxylic acid anhydride, a N-alkyl half amide of said anhydride where the alkyl group has from 1 to 6 carbons or mixtures thereof.

2. The process of claim 1 wherein said alkyl group in every instance is methyl.

3. The process of claim 1 wherein said alkyl group in every instance is ethyl.

4. The process of claim 1 wherein said alkyl group in every instance is propyl.

5. The process of claim 1 wherein said alkenyl aromatic monomer is styrene.

6. The process of claim 2 wherein said alkenyl aromatic monomer is styrene.

7. The process of claim 3 wherein said alkenyl aromatic monomer is styrene.

8. The process of claim 4 wherein said alkenyl aromatic monomer is styrene.

9. The process of claim 1 wherein said interpolymer is prepared by reacting a N-alkyl primary amine, where the alkyl group has from 1 to 6 carbons, with a copolymer of at least 50 mole percent of an alkenyl aromatic monomer and from 5 to 50 mole percent of an unsaturated dicarboxylic acid anhydride.

10. The process of claim 9 wherein said copolymer is a styrene-maleic anhydride copolymer.

References Cited

UNITED STATES PATENTS

| | | | |
|---|---|---|---|
| 3,632,791 | 1/1972 | Rupprecht et al. | 260—41 AG |
| 3,666,720 | 5/1972 | Nield et al. | 260—47 UA |
| 3,639,509 | 2/1972 | Andrascheck et al. | 260—876 R |
| 3,480,598 | 11/1969 | Nield | 260—78.5 |
| 3,652,726 | 3/1972 | Nield et al. | 260—876 |
| 3,398,092 | 8/1968 | Fields et al. | 210—24 |
| 3,678,016 | 7/1972 | Zimmerman et al. | 260—78.4 D |
| 3,492,196 | 1/1970 | Moore | 161—160 |

JOSEPH L. SCHOFER, Primary Examiner

J. KIGHT, Assistant Examiner

U.S. Cl. X.R.

260—78.5 T; 264—331